Jan. 21, 1947.  S. L. LINDBECK  2,414,539
TORQUE REGULATOR
Filed June 16, 1943

WITNESSES:
Alice P. Howell
Mr. La Grouse

INVENTOR
Simon L. Lindbeck.
BY
Paul E. Friedemann
ATTORNEY

Patented Jan. 21, 1947

2,414,539

UNITED STATES PATENT OFFICE 2,414,539

TORQUE REGULATOR

Simon L. Lindbeck, Wilkinsburg, Pa., assignor to Westinghouse Electric Corporation, East Pittsburgh, Pa., a corporation of Pennsylvania Application June 16, 1943, Serial No. 491,009

5 Claims. (Cl. 172—8)

This invention relates to electric control means and more particularly to systems of control for limiting the torque on prime movers operating generators connected to operate electric motors.

One broad object of my invention is to control the excitation of a generator, having a relatively large motor connected thereto, in such a manner that large variations of load torque on the motor do not overload the prime mover operating the generator.

Another more specific object of my invention is to control the excitation of an alternator driven by a Diesel engine so that the speed on the Diesel engine can not fall below a given value.

Another object of my invention is the provision of regulating the torque imposed on a Diesel engine by an alternating current generator to prevent stalling of the engine because of an undue rise in torque.

My torque regulator is of particular advantage in an alternating current Diesel-electric ship propulsion system. During maneuvering conditions severe torques may be imposed on the motors when they are operating at low speeds. During this operation it is desirable to obtain as high a torque as is possible, limited only by the torque capacity of the engines.

A still further object of my invention is the provision of automatic, simple, cheap, and efficient means for limiting the torque output of Diesel engines to the highest values which the engines will sustain without falling below the minimum permissible speed value.

Figure 1:
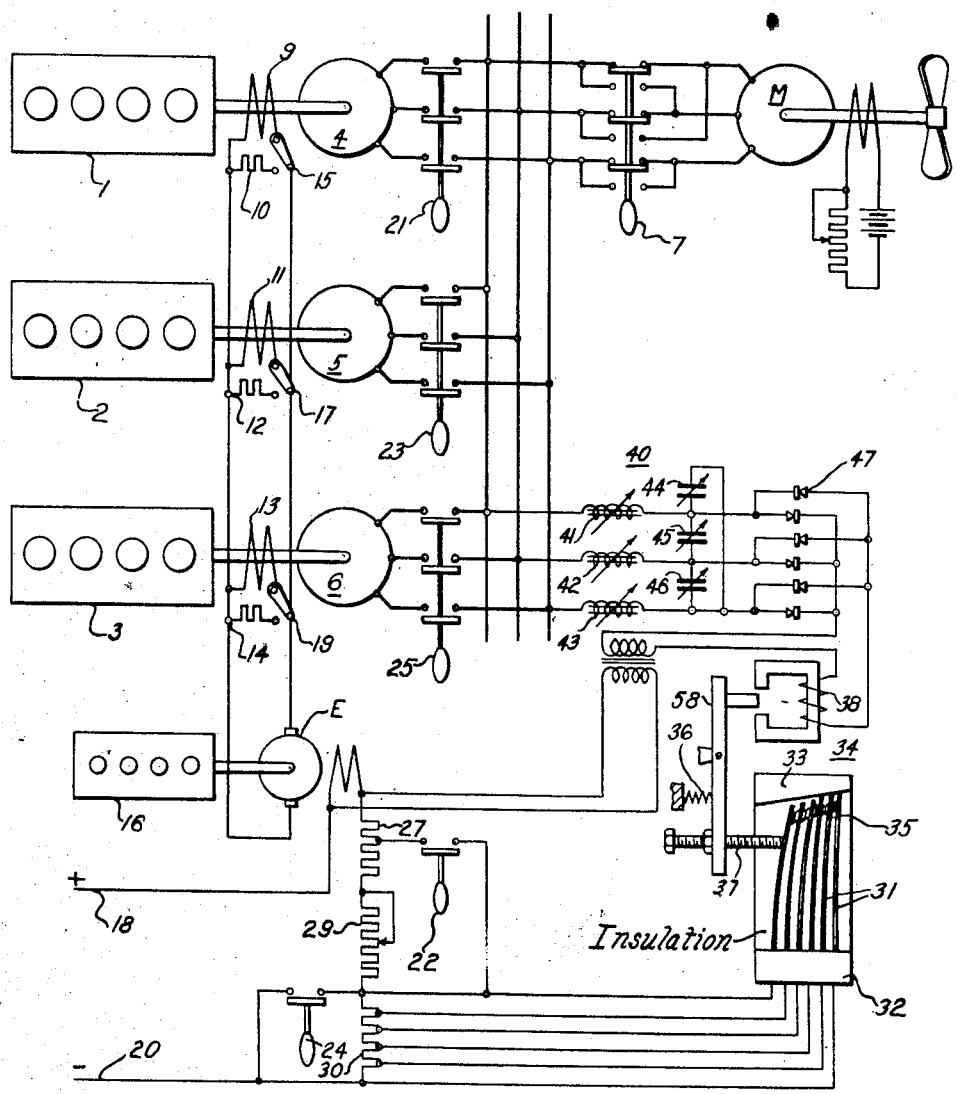
Figure 2:
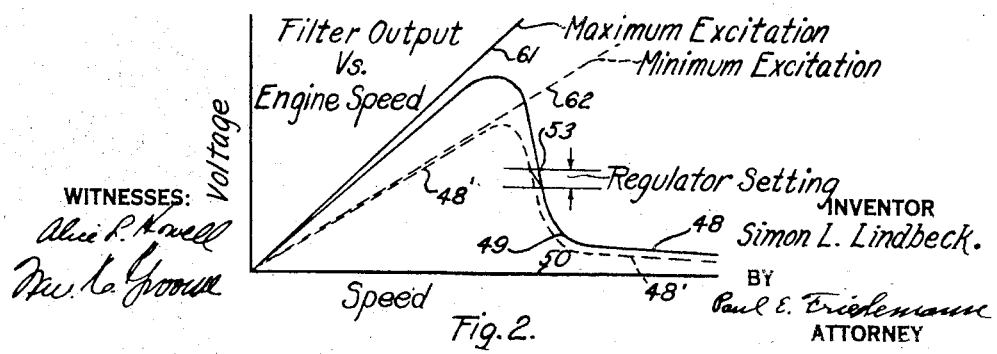

Other objects of my invention will become more apparent from a study of the following specification and the accompanying drawing, in which:

Figure 1 is a diagrammatic showing of a ship propulsion system using my invention; and Fig. 2 is a showing of some curves for illustrating the novel features of my invention.

In Diesel-electric alternating current driven ships usually from one to eight Diesel engines are mechanically coupled to as many alternators which together or any selected group supply energy to a single synchronous motor driving a propeller. There may, of course, be several propellers per ship, in which case several groups of these units are used.

For convenience I show only three Diesel engines 1, 2 and 3 driving respectively, the alternators 4, 5 and 6. The arrangement is such that the motor M may be connected for either direction of operation by the reversing switch 7. The motor is excited from a suitable source as shown and the generator field windings 9, 11 and 13 may be selectively connected to the exciter E by the switches 15, 17 and 19. The generators, or alternators, may be connected to the motor M in any combination group by the switches.

In actual practice the arrangement of the switches so far mentioned is not as simple as I show them but suitable interlocking means are provided. For instance when switch 21 is closed, switch 15 should be in the position shown, and when switch 21 is open the discharge resistor 10 should be connected to the field 9. A similar relation holds for switches 17 and 23 and discharge resistor 12, and switches 19, and 25 and discharge resistor 14.

The exciter E is driven at a constant speed by a suitable engine 16. To control the field excitation of the alternators I provide a source of constant potential evidenced by buses 18 and 20. For normal cruising at normal speeds switch 22 is open and switch 24 closed. The generator excitation is thus controlled by resistor 27 and rheostat 29.

During starting and maneuvering it is however important to limit the torque on the Diesel engines. As is well known internal combustion engines and particularly Diesel engines have critical speed torque characteristics. A Diesel engine running if subjected to a torque above the critical point on its speed torque characteristic will stall. To prevent such stalling, it is imperative that the alternator excitation be decreased. To effect this decrease considerably more rapidly than the speed decrease of the alternator I provide the resistor 30 having many sections. For simplicity I have shown only five sections.

To separate points on this resistor 30, I connect a plurality of resilient contact members 31. These contact members are mounted in a base 32 of insulating material and at the free ends are arranged to successively contact the wedge-shaped block 33 of insulating material.

For the controlling effect I wish to obtain, I provide such energization for the electromagnetic device 34 that all or substantially all the resilient contact members 31 contact each other at 35 to thus shunt all or substantially all the sections of resistor 30. Thus I accomplish by suitable selection of the compression spring 36 and suitable positioning of pin 37 for an energization of coil 38 represented by the portion of the curve 48 (see Fig. 2) to the right of point 49.

To effect the desired rapid decrease in the alternator excitation at the critical low speed of the engine I utilize a low pass filter circuit 40.

In this low-pass filter circuit I provide three adjustable reactors 41, 42 and 43—one for each phase—and three adjustable capacitors 44, 45 and 46—one for each phase. It is not essential that three-phase reactors and three phase capacitors be used. A single phase low pass filter may be used. There are, of course, some advantages in the use of three phase equipment. Among other advantages is the smoother and more uniform output. Ordinarily the adjustment of the reactors and the capacitors would be done at the factory so that attendants cannot alter the characteristics of the low pass filter circuit.

To obtain a direct current output voltage I utilize the three phase rectifier 47. The direct current output terminals of these rectifiers are connected to the coil 38. It is thus apparent coil 38 is energized proportional to the output voltage of the low pass filter circuit.

I so tune the circuit that coil 38 is energized substantially a constant amount for all frequencies, or speeds, falling to the right of point 49. As the frequency decreases the curve 48 gradually becomes curve 48' at region 53. At a speed represented by point 50 corresponding to the change from curve 48 to 48' at region 53, the energization of coil 38 suddenly rises. The armature 58 is thus moved clockwise and resilient contact members contact block 33 in so doing breaks the contacts at 35. The excitation of the exciter is thus decreased rapidly with the result that the generator excitation drops from curve 61 to 62. Overloading of the engines is thus prevented and no stalling will take place. It is of course apparent that during these operations switch 24 must be open.

From the foregoing it will be apparent that I have provided a cheap and efficient means for preventing the stalling of the engine or engines in the use at the low speeds.

I claim as my invention:

1. In a ship propulsion system, in combination, a Diesel engine, an alternator coupled to be driven by said Diesel engine, a low pass filter circuit connected to the alternator output terminals, and low pass filter circuit including adjustable reactors and adjustable capacitors and an output circuit, and low pass filter circuit being adjusted to have a relatively low constant output for all alternator frequencies above a given frequency but which exhibits a rapid rise in energy output as the alternator frequency is decreased below said given frequency, and means responsive to the rapid rise of energy output of said low pass filter circuit for decreasing the excitation of said alternator to thus reduce the torque on said Diesel engine.

2. In a ship propulsion system, in combination, a conventional Diesel engine which, as is well known, may stall if subjected to an excessive torque at low speed, an alternator coupled to said Diesel engine, load means connected to said alternator, a field winding for the alternator, a multi-step adjustable resistor for varying the current in the field winding, electromagnetic means for adjusting the adjustable resistor, and means responsive to a given range of frequencies of the alternator for controlling the operation of said electromagnetic means.

3. In a ship propulsion system, in combination, a propeller driving motor, an alternator connected to the motor for operating the motor, a variable speed prime mover coupled to drive the alternator to generate alternating current of varying frequency to alter the speed of the motor, said prime mover being of the type having a limited torque output at low speeds, a field winding for the alternator, exciting means for exciting the alternator field winding, said exciting means including a circuit having a resistor included therein, a plurality of contact members connected to separate points along said resistor, stop means for spacing the contact members when engaging said stop means, electromagnetic means responsive to the frequency of the alternator and normally so energized by the alternator for all frequencies above a certain low frequency as to actuate said contact members away from said stop means to thus maintain substantially all the sections of said resistor short-circuited but when the alternator frequency drops to said certain low frequency releases said contact members to move against said stop means to thus successively remove the short circuit from sections of said resistor to thus decrease the field excitation of the alternator, whereby the torque is decreased on the prime mover.

4. In a ship propulsion system, in combination, an alternator driven by a suitable variable speed prime mover, to generate alternating current of varying frequency, a low pass filter circuit including reactors, capacitors, and rectifiers connected to said alternator, the adjustment of said low pass filter circuit being such that the output voltage of the rectifiers remains substantially constant and at a relatively low value for all alternator frequencies above a given value but rises rapidly as the alternator frequency drops below a certain value, and electromagnetic means for decreasing the field excitation substantially proportional to the output voltage of the rectifiers.

5. In a power system, in combination, an alternator driven by a suitable variable speed prime mover, said alternator having a field winding, excitation control means for controlling the excitation of said alternator, a low pass filter circuit connected to the alternator, means for tuning the said filter circuit so as to produce a rapidly rising output voltage of the filter circuit at a certain relatively low alternator frequency, and means operable as an inverse function of the voltage output of the filter circuit for correspondingly affecting the excitation control means.

SIMON L. LINDBECK.